United States Patent
Johnson, Jr.

(10) Patent No.: US 8,590,661 B1
(45) Date of Patent: Nov. 26, 2013

(54) PICKUP TRUCK EXHAUST BACK PRESSURE REDUCTION SYSTEM

(71) Applicant: Andrew Lee Johnson, Jr., Cincinnati, OH (US)

(72) Inventor: Andrew Lee Johnson, Jr., Cincinnati, OH (US)

( * ) Notice: Subject to any disclaimer, the term of this patent is extended or adjusted under 35 U.S.C. 154(b) by 0 days.

(21) Appl. No.: 13/723,936

(22) Filed: Dec. 21, 2012

(51) Int. Cl.
*B60K 13/04* (2006.01)
*F01N 13/08* (2010.01)

(52) U.S. Cl.
CPC .................................. *F01N 13/082* (2013.01)
USPC .............................. 180/309; 60/319; 446/217

(58) Field of Classification Search
CPC ............................. F01N 13/082; B60K 13/04
USPC ............ 180/309; 60/317, 319; 446/210, 211, 446/217, 218, 176
See application file for complete search history.

(56) References Cited

U.S. PATENT DOCUMENTS 7,086,224 B1 * 8/2006 Perry .............................. 60/319
7,089,731 B1 * 8/2006 Perry .............................. 60/319

* cited by examiner

*Primary Examiner* — John R Olszewski
*Assistant Examiner* — Jacob Meyer

(57) ABSTRACT

Pickup truck exhaust back pressure reduction system is composed of a base plate that is an exhaust inlet which is mounted to the pickup truck bed floor just behind the cab, a rotating barrel tower which is stationary and vertically mounted on top of the base plate as a trap for the exhaust stream, a rotating barrel and bearings assembly which rotate in the inside top of the rotating barrel tower, a flywheel being attached to the upper bearing shaft and the motor being attached to the trim plate which surrounds the rotating barrel tower adjacent the flywheel and within engaging distance of the flywheel. The rotating barrel is actuated by a variable D/C voltage current which is powered by the pickup trucks engine and rotates slow at low engine r.p.m.'s and higher at high engine r.p.m.'s which then at high r.p.m.'s the turbine which is located in the lower hollow end of the rotating barrel starts to create vacuum which pulls the exhaust stream and creates back pressure reduction.

1 Claim, 4 Drawing Sheets

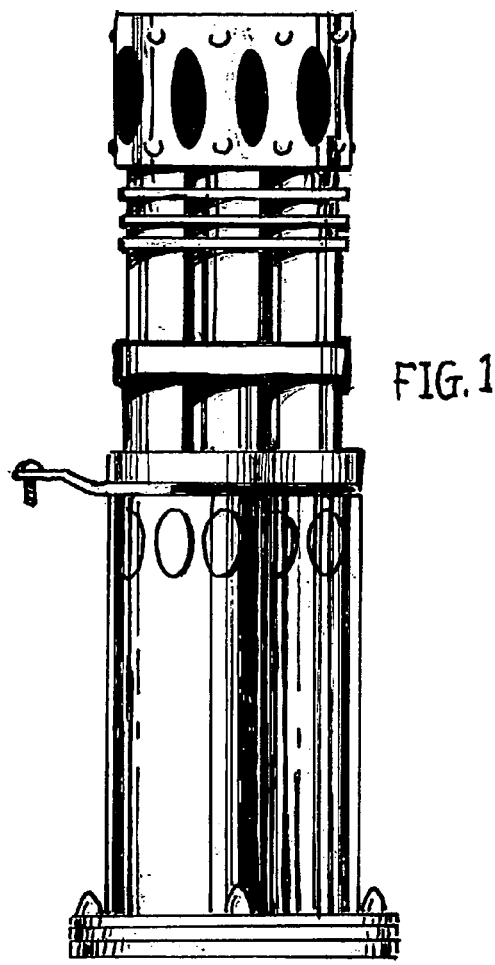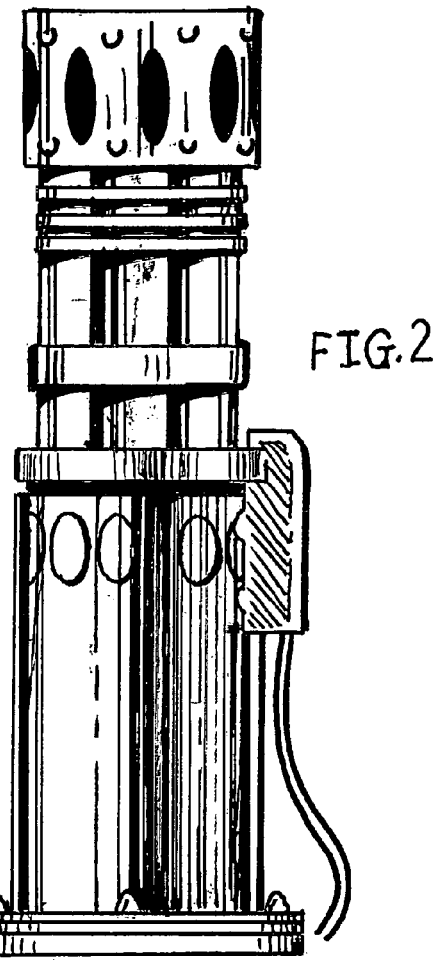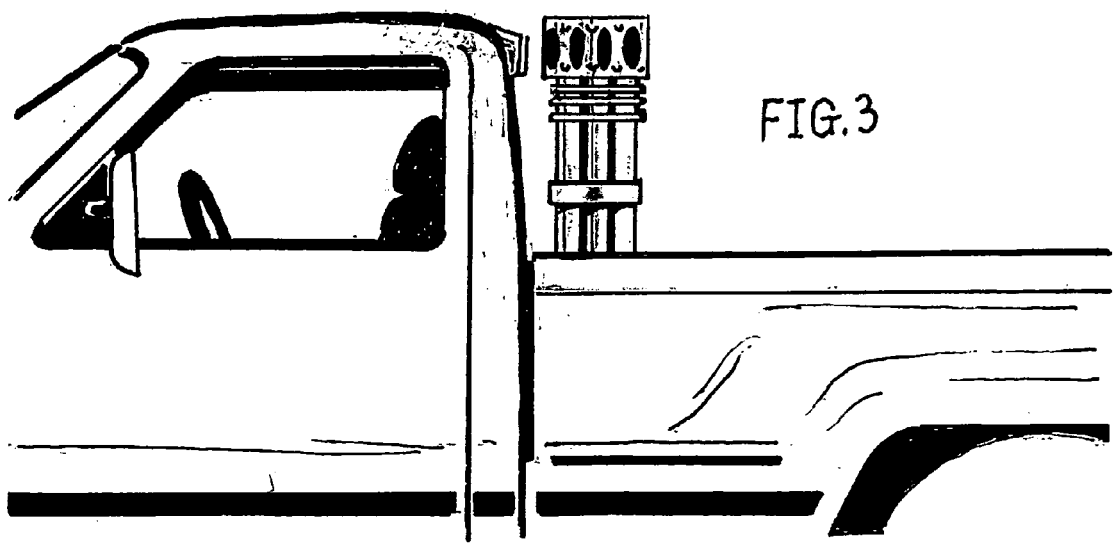

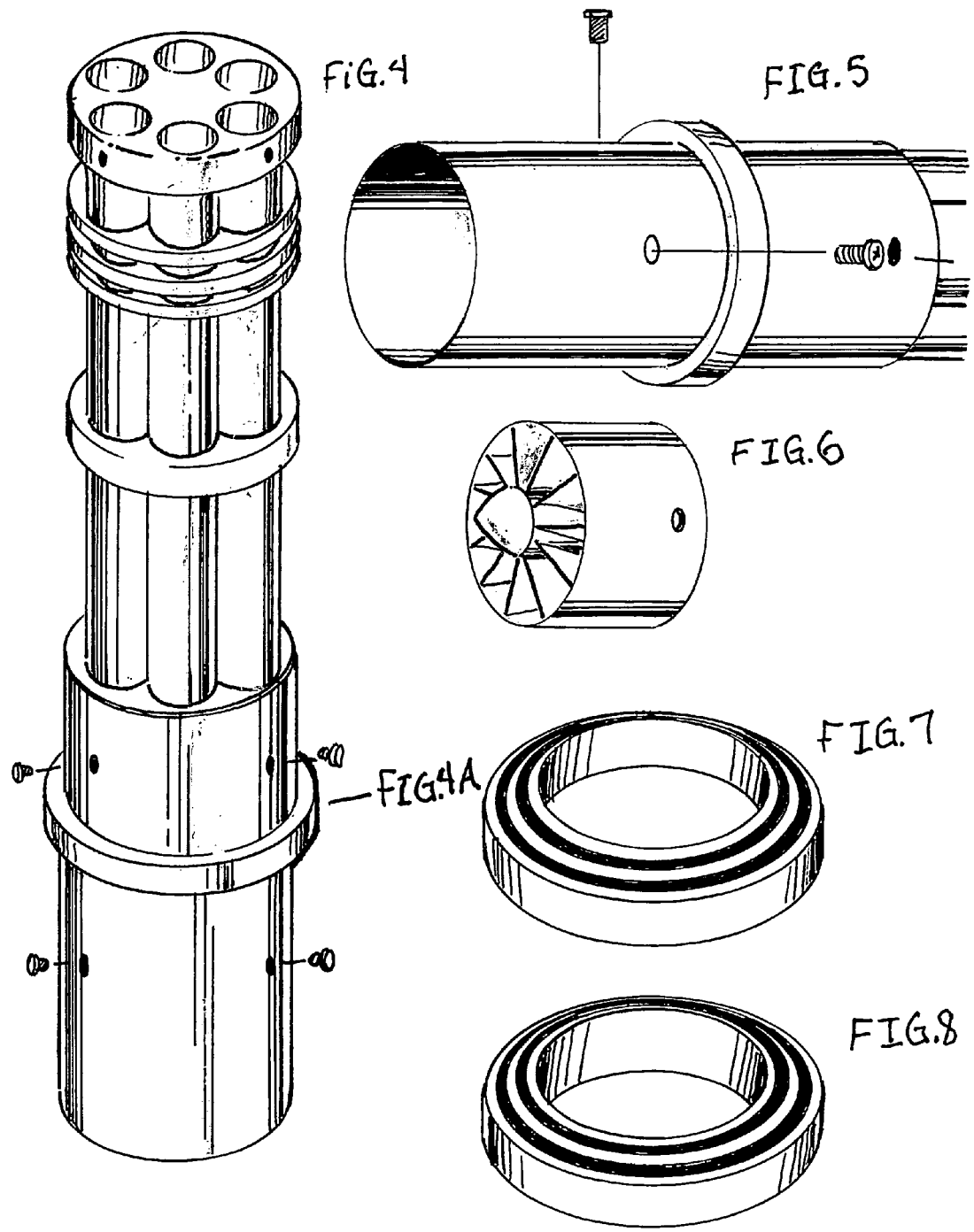

Figure 9:
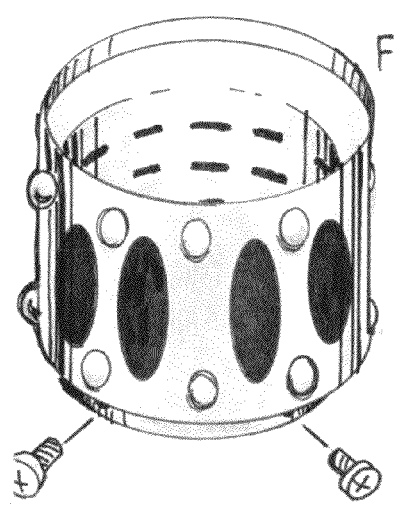

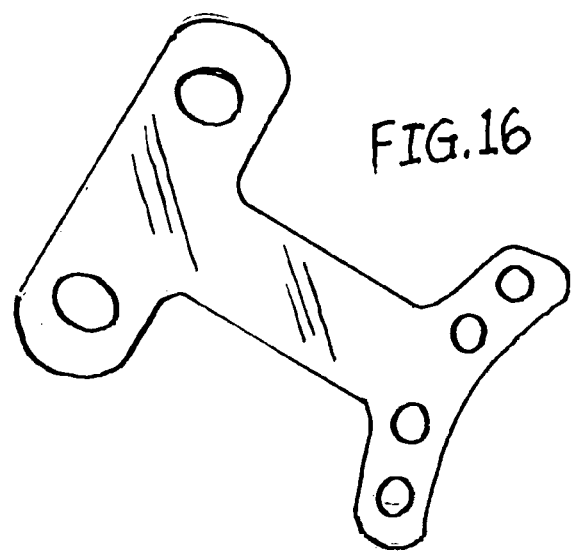
FIG. 16
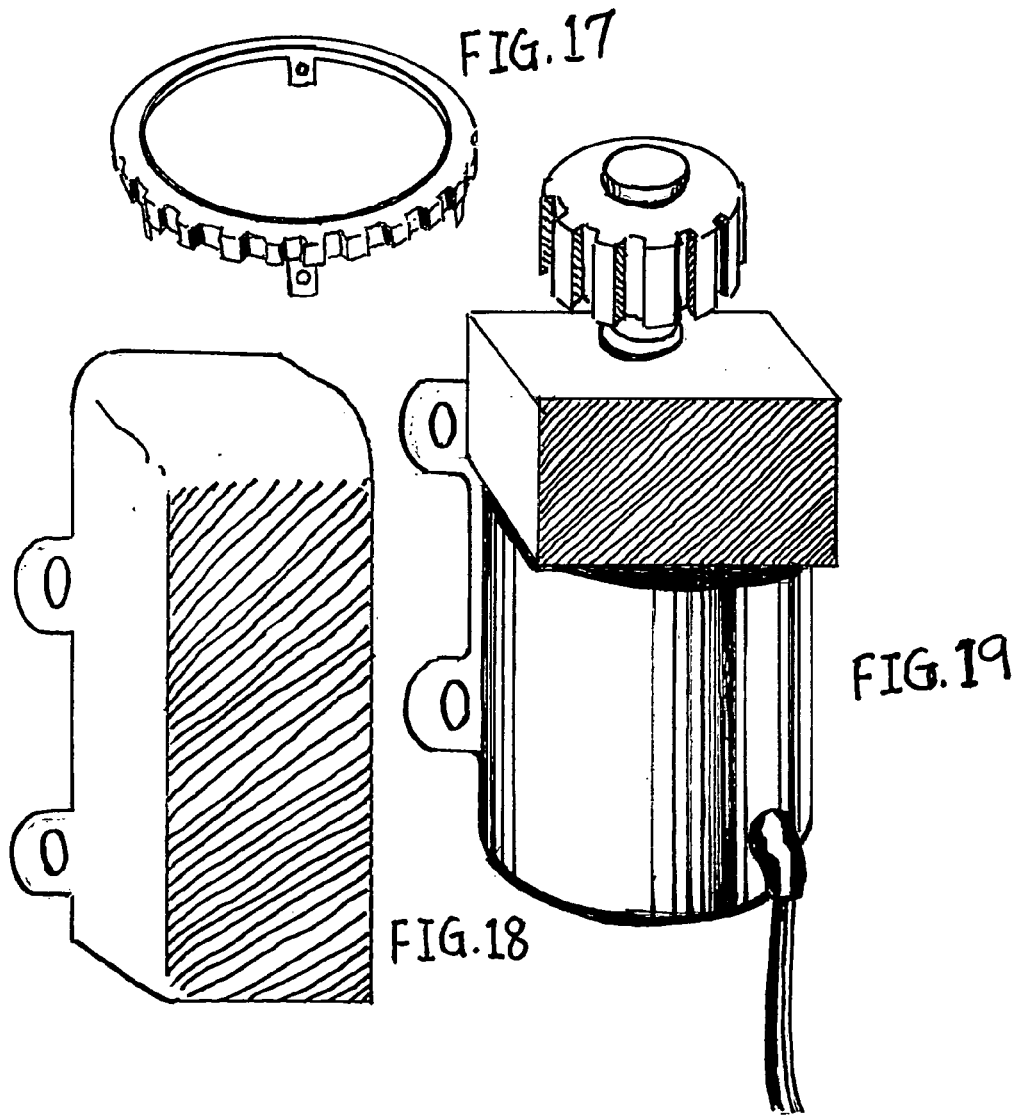
FIG. 17
FIG. 18
FIG. 19

PICKUP TRUCK EXHAUST BACK PRESSURE REDUCTION SYSTEM

BACKGROUND OF THE INVENTION

Pickup trucks are designed and expected to perform tasks such as towing, hauling and a variety of heavy duty jobs that aren't expected of automobiles, vans or SUVs (sports utility vehicles) and need a more efficient means of releasing exhaust in mid to high r.p.m. (revolutions per minute) ranges to relieve manifold exhaust pressure and increase horse power and torque faster.

BRIEF SUMMARY OF THE INVENTION

The pickup truck exhaust back pressure reduction system is vertically mounted to the pickup truck bed floor. The bottom half (base plate, rotating barrel tower and trim plate) receives the end of the exhaust pipe which comes from the engines muffler and traps the exhaust stream from the muffler pipe and then releases the exhaust stream past the turbine and up through the rotating barrel. The rotating barrel is composed of six cylinders which are but not limited to fifteen inches in length and are but not limited to one inch in inside diameter and are welded together to resemble a gun barrel. The rotating barrel has two bearings that it rotates within inside the top of the rotating barrel tower. The rotating barrel also has a flywheel attached to the upper bearing shaft and a motor which actuates the flywheel (located on trim plate) that has a variable D/C voltage current that fluctuates low to high current according to the engines r.p.m. ranges. At mid to high r.p.m.s the turbine creates vacuum and causes exhaust back pressure reduction which increases horse power and torque.

BRIEF DESCRIPTION OF THE SEVERAL VIEWS OF THE DRAWING(S)

FIG. 1 Side view of pickup truck exhaust back pressure reduction system

FIG. 2 Front view of pickup truck exhaust back pressure reduction system

Figure 10:
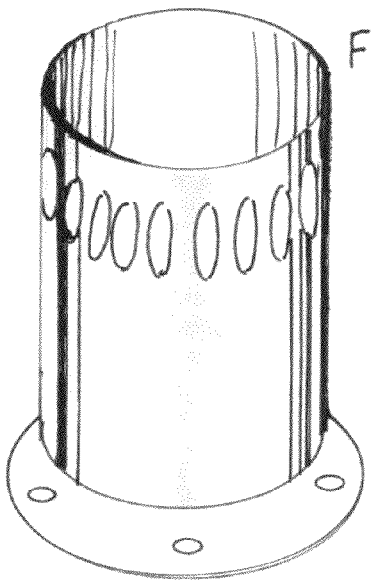
Figure 11:
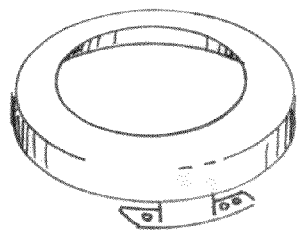
Figure 12:
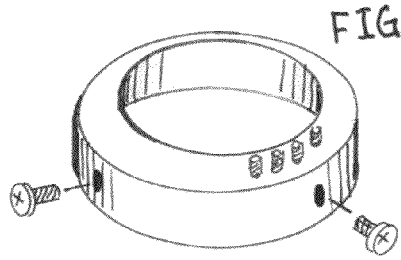

FIG. 3 View of pickup truck exhaust back pressure reduction system installed in the bed of a pickup truck FIG. 4 Rotating barrel FIG. 5 View of hollow bottom end of rotating barrel where turbine is mounted FIG. 6 Turbine FIG. 7 Upper bearing that sits on top of rotating barrel ledge FIG. 4A. Rotating barrel ledge FIG. 8 Lower bearing which is located underneath rotating barrel ledge and sits on barrel seat tower ledge FIG. 9 Exhaust tip, which is mounted to the top of the rotating barrel FIG. 10 Trim plate for barrel seat tower FIG. 11 Trim plate for flywheel FIG. 12 Retainer cap (secures bearings and rotating barrel)

Figure 13:
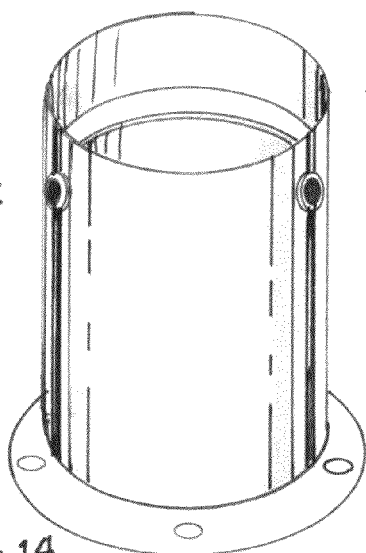

FIG. 13 Top view of barrel seat tower showing barrel seat tower ledge

Figure 14:
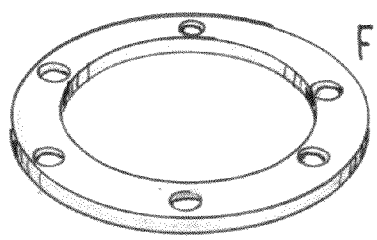
Figure 15:
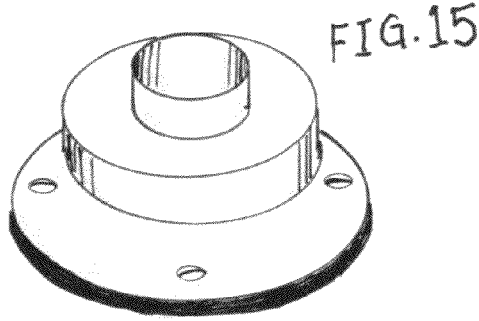

FIG. 14 Inlet base plate gasket that sits on top of inlet base plate and underneath barrel seat tower FIG. 15 Inlet base plate FIG. 16 Bed rail brace which is mounted to the pickup truck bed rail and the retainer cap underneath the flywheel trim plate FIG. 17 Flywheel, which is mounted to the rotating barrel above the retainer cap FIG. 18 Motor trim plate, keeps dust and elements from motor FIG. 19 Motor, engages flywheel and causes barrel rotation

DETAILED DESCRIPTION OF THE INVENTION

The pickup truck exhaust back pressure reduction system is vertically mounted to the pickup truck bed floor. The bottom half (base plate, rotating barrel tower and trim plate) receives the end of the exhaust pipe which comes from the engines muffler and traps the exhaust stream from the muffler pipe and then releases the exhaust stream past the turbine and up through the rotating barrel. The rotating barrel is composed of six cylinders which are but not limited to fifteen inches in length and are but not limited to one inch in inside diameter and are welded together to resemble a gun barrel. The rotating barrel has two bearings that it rotates within inside the top of the rotating barrel tower. The rotating barrel also has a flywheel attached to the upper bearing shaft and a motor which actuates the flywheel (located on trim plate) that has a variable D/C voltage current that fluctuates low to high current according to the engines r.p.m. ranges. At mid to high r.p.m.s the turbine creates vacuum and causes exhaust back pressure reduction which increases horse power and torque.

1.) Rotating barrel
1A.) Rotating lower barrel shaft and ledge
2.) Flash suppressor (made in various looks)
3.) Flywheel trim plate (protects flywheel)
4.) Main trim plate
5.) Retainer cap brace (it braces the retainer cap to the pickup trucks bedrail)
6.) Retainer cap (secures rotating barrel and bearings
7.) Barrel seat tower
7A.) Barrel seat tower ledge
8.) Upper bearing
8A.) Lower bearing
9.) Turbine (reduces exhaust back pressure at high r.p.m.s)
10.) Exhaust inlet plate (it secures and mounts to the exhaust pipe that comes up from the exhaust muffler)
11.) Flywheel (mounts revolving barrel stack just above retainer cap
12.) Motor (has variable D/C current which gives higher D/C current at higher r.p.m.s)
12A.) Motor trim plate (protects motor from dust and elements)
13.) Inlet base plate gasket

I claim:

1. An exhaust back pressure reduction system comprising: a) a vertical entity which is mounted to a pickup truck bed floor of a pickup truck behind a cab of said pickup truck, b) an inlet base plate which sits on a pickup truck bed floor of said pickup truck and receives an exhaust pipe from an engine of said pickup truck, c) a barrel seat tower that sits on top of said inlet base plate and houses a rotating barrel, upper and lower bearings and a turbine, d) a retainer cap which bolts to a top of said barrel seat tower to secure said rotating barrel, bearings and turbine, e) a trim plate which sits on top of a foot plate of said barrel seat tower and around said barrel seat tower, f) a flywheel which is bolted to said rotating barrel ½ inch above said retainer cap, g) a motor that is mounted to an outside top of said trim plate ¼ inch below said flywheel, h) a truck bed rail brace, and i) a flywheel trim plate; wherein the exhaust pipe that comes from the pickup truck engine comes from underneath the pickup truck and up through the pickup truck bed floor and through said inlet base plate and is mounted to said inlet base plate such that exhaust from the engine streams into an inner chamber of said barrel seat tower and then streams through said turbine and then up through said rotating barrel; wherein said rotating barrel is comprised of six cylinders which are preferably, but not limited to, one inch inside diameter which gives a greater opening for exhaust release; wherein said rotating barrel is actuated by said motor when said motor engages said flywheel which is mounted to said rotating barrel; wherein said motor has a variable D/C voltage current which fluctuates according to said pickup truck engine r.p.m. (revolutions per minute) ranges, wherein at low r.p.m.s said motor will get a low voltage current and at high r.p.m. ranges said motor will get higher voltage current; and wherein, when said pickup truck engine r.p.m. range reaches 1,500 r.p.m., said turbine creates vacuum inside said barrel seat tower which creates pickup truck exhaust back pressure reduction.

* * * * *